United States Patent [19]

Burchill et al.

[11] Patent Number: 4,868,011

[45] Date of Patent: Sep. 19, 1989

[54] PROCESS FOR SURFACE MODIFICATION OF POLYMER ARTICLES

[75] Inventors: Michael T. Burchill, Cranbury; Maryam Rafiei, Bayonne; Joseph Silbermann, Old Bridge, all of N.J.

[73] Assignee: M&T Chemicals Inc., Woodbridge, N.J.

[21] Appl. No.: 209,619

[22] Filed: Jun. 21, 1988

Related U.S. Application Data

[63] Continuation-in-part of Ser. No. 945,595, Dec. 23, 1986, Pat. No. 4,770,905.

[51] Int. Cl.$^4$ .............................................. B05B 5/00
[52] U.S. Cl. .................................... 427/160; 427/331; 427/336; 427/352; 427/353; 427/377; 427/430.1; 427/434.2
[58] Field of Search ............... 427/160, 331, 336, 353, 427/377, 430.1, 434.2, 352

[56] References Cited

U.S. PATENT DOCUMENTS

| | | |
|---|---|---|
| 3,043,709 | 7/1962 | Amborski .......................... 427/160 |
| 3,297,462 | 1/1967 | Fanning ............................. 427/160 |
| 3,519,462 | 7/1970 | Christian .......................... 427/160 |
| 3,656,991 | 4/1972 | Blackwell et al. ................. 427/160 |
| 3,783,011 | 1/1974 | Chauffoureaux .................. 427/160 |
| 4,126,660 | 11/1978 | Lempkowicz et al. ............. 264/101 |
| 4,146,658 | 3/1979 | Humphrey ......................... 427/160 |
| 4,323,597 | 5/1982 | Chilton ............................. 427/160 |
| 4,349,607 | 9/1982 | Ching ............................... 428/412 |

*Primary Examiner*—Janyce Bell
*Attorney, Agent, or Firm*—S. A. Marcus; W. Katz

[57] ABSTRACT

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid. The improvement herein comprises removing a substantial amount of air dissolved in the water layer to prevent droplets of solution from rising to the surface of the water layer during the process, thereby preventing solid modifier material from accumulating on the water surface.

6 Claims, No Drawings

PROCESS FOR SURFACE MODIFICATION OF POLYMER ARTICLES

CROSS-REFERENCE TO RELATED PATENT APPLICATIONS

This application is a continuation-in-part of copending patent application Ser. No. 945,595, filed 12/23/86, now U.S. Pat. No. 4,770,905 entitled "Process for Surface Modification of Polymer Articles", which disclosure is hereby incorporated by reference.

BACKGROUND OF INVENTION

1. Field of the Invention

This invention relates to surface modified resinous articles, and processes for making same, and more particularly, to an improved method for making said articles in a continuous manner.

2. Description of the Prior Art

In the aforesaid copending patent application, there is described a method of incorporating a modifier ingredient such as a UV absorber into the surface region of a resinous body such as a PVC sheet. The method includes the steps of: (1) immersing the body in a liquid such as water and (2) contacting the immersed body with a solution of the modifier ingredient in a solvent such as methylene chloride which is immiscible with the liquid and which will swell the surface of the resin to allow the solution to enter its surface region.

In the continuous mode of practicing this process, the solution is present as a lower layer, water is the upper layer, a continuous polymer sheet article is transported through the water, and the solution is pumped from the lower layer to the upper layer and directed onto the top surface of the sheet for a predetermined contact time during which the modifier ingredient is incorporated into the contacted surface. After the solution is applied, a jet of water is directed onto the treated surface to displace any residual solution remaining thereon.

When this process is run for a extended period at room temperature, however, it is observed that a solid precipitate of UV stabilizer material accumulates on the surface of the water layer. This solid material circulates through the system and tends to clog the pumping and piping equipment used both for applying the solution to the resin surface and for displacing residual solution thereon.

While suitable filters and/or skimmers may be used in the system to remove solid material floating on the surface of the water layer, such techniques require relatively costly equipment and periodic maintenance.

Accordingly, it is an object of the present invention to provide a method for preventing solid modifier material from appearing and collecting on the surface of the waterlayer in the resin surface modification process of the aforesaid patent application.

A more particular object herein is to provide a physical method of substantially eliminating the problem of solid formation on the surface of the water layer in such process A feature of the invention is the provision of a deaeration step in the said process to physically remove dissolved air from the water layer.

These and other objects and features of the invention will be made apparent from the following more particular description thereof.

SUMMARY OF THE INVENTION

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid. The improvement herein comprises removing a substantial amount of air dissolved in the water layer to prevent droplets of solution from rising to the surface of the water layer during the process, thereby preventing solid modifier material from accumulating o the water surface.

DETAILED DESCRIPTION OF THE INVENTION

It has been discovered that ar dissolved in the water layer is instrumental in enabling droplets of modifier solution to reach the surface of the water layer. Accordingly, several methods are provided herein for removing a substantial amount of air dissolved in the water layer used in the two-phase surface modification process. These techniques include: (1) boiling the water to remove dissolved air, followed by cooling; (2) deaerating the water by applying a vacuum over the water; and (3) subjecting the water to sonic energy. Other deaeration techniques for effecting the desired result will become apparent to those skilled in the art and may be employed as alternative to those described above.

The invention will be illustrated by reference to the following examples.

EXAMPLE 1

In a laboratory experiment which illustrates the principle of the invention, 500 g of a solution of 200 g of solid ultraviolet light stabilizer, e.g. Cyasorb UV 5411 (Trademark of American Cyanamid Co.) dissolved in 800 g of methylene chloride, was added to a 4 l bell jar and covered with a 3 l blanket of tap water at 25° C. A peristaltic pump was used to pump the solution from the lower solution layer to and through the upper water layer. Pumping of solution was continued for 90 minutes. Solid stabilizer was observed to precipitate on the surface of the water; it was collected, dried and weighed. 2.5 g of solid material was obtained.

EXAMPLE 2

The procedure above was followed except that the tap water was boiled for 10 minutes and then cooled to room temperature. Only 0.1 g of solid material was collected after 90 minutes.

EXAMPLE 3

500 ml of water was deaerated for 20 minutes in a vacuum desiccator by pulling 60 torr of vacuum. The deaeration step was repeated to make 3500 ml of deaerated water, which was then cooled to 17° C. A solution of 20% wt/vol of Cyasorb 5411 in methylene chloride was pumped through the upper water layer and back to the lower solution phase for a period of 90 minutes. The apparatus was uncovered during this period. Only 0.006 g of precipitate was formed on the surface of the water.

These results show that deaeration of the water layer is a particularly effective method for substantially eliminating the problem of formation of solid material on the surface of the water layer during the underwater impregnation process.

While the invention has been described with particular reference to certain embodiments thereof, it will be understood that changes and modifications may be made which are within the skill of the art. Accordingly, it is intended to be bound only by the claims which follow.

We claim:

1. In a method of incorporating a modifier ingredient into the surface region of a resinous article comprising immersing the article in a liquid and contacting the immersed article with a solution of a modifier ingredient in a solvent which is substantially immiscible with the liquid, the improvement which comprises:

removing a substantial amount of the air dissolved in the liquid to prevent any appreciable number of droplets of solution from rising through the liquid to the surface thereof, thereby effectively preventing solid modifier material from depositing and accumulating on the surface of the liquid.

2. A method according to claim 1 wherein said liquid is water.

3. A method according to claim 2 wherein said removal is carried out by boiling the water.

4. A method according to claim 2 wherein said removal is carried out by subjecting the water to vacuum conditions.

5. A method according to claim 2 wherein said modifier ingredient is a solid ultraviolet light stabilizer.

6. A method according to claim 2 wherein said solvent is methylene chloride.

* * * * *